(12) United States Patent
Rust et al.

(10) Patent No.: US 10,059,524 B2
(45) Date of Patent: Aug. 28, 2018

(54) APPARATUS AND METHOD FOR A CONVEYOR LIFT ASSEMBLY

(71) Applicant: Kolberg-Pioneer, Inc., Yankton, SD (US)

(72) Inventors: Joe Rust, Yankton, SD (US); Travis Hinnerichs, Yankton, SD (US); Andrew In't Veld, Yankton, SD (US); Kaleb Stepanek, Menno, SD (US)

(73) Assignee: Kolberg-Pioneer, Inc., Yarkton, SD (US)

( * ) Notice: Subject to any disclaimer, the term of this patent is extended or adjusted under 35 U.S.C. 154(b) by 0 days.

(21) Appl. No.: 15/490,534

(22) Filed: Apr. 18, 2017

(65) Prior Publication Data

US 2017/0297824 A1 Oct. 19, 2017

Related U.S. Application Data

(60) Provisional application No. 62/323,970, filed on Apr. 18, 2016.

(51) Int. Cl.
| | |
|---|---|
| *B65G 21/12* | (2006.01) |
| *B65G 21/14* | (2006.01) |
| *B65G 41/02* | (2006.01) |
| *B65G 41/00* | (2006.01) |

(52) U.S. Cl.
CPC ............. *B65G 21/12* (2013.01); *B65G 21/14* (2013.01); *B65G 41/002* (2013.01); *B65G 41/005* (2013.01)

(58) Field of Classification Search
CPC ...... B65G 41/002; B65G 21/12; B65G 21/14; B65G 41/003; B65G 41/005; B65G 41/008

USPC .............................................. 198/316.1, 318
See application file for complete search history.

(56) References Cited

U.S. PATENT DOCUMENTS

| | | | | |
|---|---|---|---|---|
| 3,184,045 A | * | 5/1965 | Fry | B60P 1/38 198/316.1 |
| 3,599,784 A | * | 8/1971 | Rossi | B65G 21/14 198/313 |
| 6,244,418 B1 | * | 6/2001 | Desrochers | B65G 41/002 198/316.1 |
| 6,378,686 B1 | * | 4/2002 | Mayer | B65G 21/14 198/314 |

(Continued)

*Primary Examiner* — Mark A Deuble
(74) *Attorney, Agent, or Firm* — Chambliss, Bahner & Stophel, P.C.

(57) ABSTRACT

A conveyor lift assembly adapted for use on a conveyor assembly having a frame, and at least one main conveyor cylinder for moving the frame between a substantially horizontal position and an elevated position. The conveyor lift assembly includes a lower member disposed on the undercarriage of the conveyor assembly, an upper member adapted to be moved substantially vertically relative to the frame, and an actuator having a first end and a second end and being adapted to move between a retracted position and an extended position. The first end of the actuator is attached to the lower member and the second end is attached to the upper member, the actuator is adapted to move the upper member relative to the lower member, and the upper member is adapted contact the frame. A method for moving the frame between the substantially horizontal position and the elevated position.

20 Claims, 6 Drawing Sheets

(56) References Cited

U.S. PATENT DOCUMENTS

| | | | |
|---|---|---|---|
| 7,448,491 B1* | 11/2008 | Tippery | A01D 57/20 198/813 |
| 8,733,533 B1* | 5/2014 | Duran | B65G 21/12 198/316.1 |
| 2008/0289935 A1* | 11/2008 | Hesketh | B65G 23/44 198/813 |

* cited by examiner

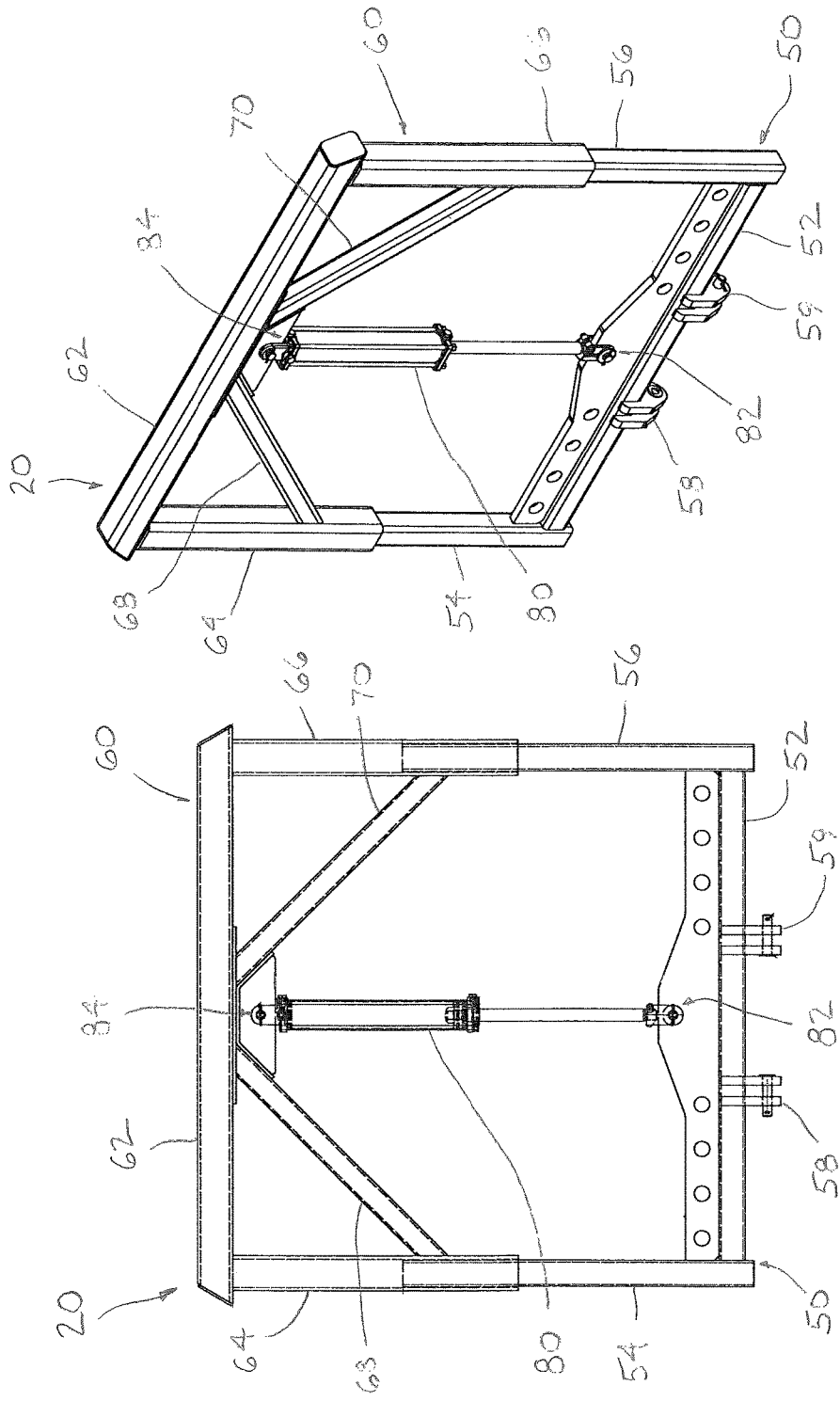

APPARATUS AND METHOD FOR A CONVEYOR LIFT ASSEMBLY

CROSS-REFERENCES TO RELATED APPLICATIONS/PATENTS

This application relates back to and claims the benefit of priority from U.S. Provisional Application for Patent Ser. No. 62/323,970 titled "Conveyor Lift Assembly" and filed on Apr. 18, 2016.

FIELD OF THE INVENTION

The present invention relates generally to apparatuses and methods for conveyor assemblies, and particularly to apparatuses and methods for conveyor lift assemblies.

BACKGROUND AND DESCRIPTION OF THE PRIOR ART

It is known to use apparatuses and methods to move conveyor assemblies between a substantially horizontal position and an elevated position. Conventional apparatuses and methods, however, suffer from one or more disadvantages. For example, conventional conveyor lift assemblies experience undesirably high pressure spikes in the main conveyor cylinders when the conveyor frame is initially moved from a substantially horizontal position toward an elevated position. As a result, conventional conveyor lift assemblies cause undesirable wear to and a reduced lifespan of the main conveyor cylinders. Conventional conveyor lift assemblies also require undesirably large and expensive main conveyor cylinders to move the conveyor frame between a substantially horizontal position and an elevated position. In addition, conventional conveyor lift assemblies have undesirably long lead times for replacement of the main conveyor cylinders, cause undesirably high tension forces in the conveyor frame, and cause undesirably high compression forces in the undercarriage. As a result, conventional conveyor assemblies are undesirably heavy and experience undesirable pin wear.

It would be desirable, therefore, if an apparatus and method for a conveyor lift assembly could be provided that would reduce pressure spikes in the main conveyor cylinders when the conveyor frame is initially moved from a substantially horizontal position toward an elevated position. It would also be desirable if such an apparatus and method for a conveyor lift assembly could be provided that would reduce wear to and increase the lifespan of the main conveyor cylinders. It would be further desirable if such an apparatus and method for a conveyor lift assembly could be provided that would allow for smaller, less expensive main conveyor cylinders to be used to move the conveyor frame between a substantially horizontal position and an elevated position. It would be still further desirable if such an apparatus and method for a conveyor lift assembly could be provided that would reduce the lead times for the replacement of the main conveyor cylinders, the tension forces in the conveyor frame, and the compression forces in the undercarriage. In addition, it would be desirable if such an apparatus and method for a conveyor lift assembly could be provided that would reduce the weight of the conveyor assembly and pin wear.

ADVANTAGES OF THE PREFERRED EMBODIMENTS OF THE INVENTION

Accordingly, it is an advantage of the preferred embodiments of the invention claimed herein to provide an apparatus and method for a conveyor lift assembly that reduces pressure spikes in the main conveyor cylinders when the conveyor frame is initially moved from a substantially horizontal position toward an elevated position. It is also an advantage of the preferred embodiments of the invention claimed herein to provide an apparatus and method for a conveyor lift assembly that reduces wear to and increases the lifespan of the main conveyor cylinders. It is another advantage of the preferred embodiments of the invention claimed herein to provide an apparatus and method for a conveyor lift assembly that allows for the use of smaller, less expensive main conveyor cylinders to move the conveyor frame between a substantially horizontal position and an elevated position. It is an advantage of the preferred embodiments of the invention claimed herein to provide an apparatus and method for a conveyor lift assembly that reduces the lead time for the replacement of the main conveyor cylinders, the tension forces in the conveyor frame, and the compression forces in the undercarriage. In addition, it is an advantage of the preferred embodiments of the invention claimed herein to provide an apparatus and method for a conveyor lift assembly that reduces the weight of the conveyor assembly and pin wear.

Additional advantages of the preferred embodiments of the invention will become apparent from an examination of the drawings and the ensuing description.

SUMMARY OF THE INVENTION

The apparatus of the invention comprises a conveyor lift assembly adapted for use on a conveyor assembly having an undercarriage, a frame, an axle, and at least one main conveyor cylinder for moving the frame between a substantially horizontal position and an elevated position. The preferred conveyor lift assembly comprises a lower member that is disposed on the undercarriage of the conveyor assembly, an upper member that is adapted to be moved substantially vertically relative to the lower member, and an actuator having a first end and a second end and being adapted to move between a retracted position and an extended position. In the preferred embodiments of the conveyor lift assembly, the first end of the actuator is attached to the lower member and the second end of the actuator is attached to the upper member, the actuator is adapted to move the upper member relative to the lower member, and the upper member is adapted contact the frame of the conveyor assembly.

The method of the invention comprises a method for moving a conveyor frame between a substantially horizontal position and an elevated position. The preferred method comprises providing a conveyor lift assembly adapted for use on a conveyor assembly having an undercarriage, a frame, an axle, and at least one main conveyor cylinder for moving the frame between a substantially horizontal position and an elevated position. The preferred conveyor lift assembly comprises a lower member that is disposed on the undercarriage of the conveyor assembly, an upper member that is adapted to be moved substantially vertically relative to the lower member, and an actuator having a first end and a second end and being adapted to move between a retracted position and an extended position. In the preferred embodiments of the conveyor lift assembly, the first end of the actuator is attached to the lower member and the second end of the actuator is attached to the upper member, the actuator is adapted to move the upper member relative to the lower member, and the upper member is adapted contact the frame of the conveyor assembly. The preferred method also comprises moving the frame between the substantially horizontal position and the elevated position.

BRIEF DESCRIPTION OF THE DRAWINGS

The presently preferred embodiments of the invention are illustrated in the accompanying drawings, in which like reference numerals represent like parts throughout, and in which:

FIG. 4 is a front view of the preferred conveyor lift assembly illustrated in FIGS. 1-3 shown in an extended position.

FIG. 5 is a perspective front view of the preferred conveyor lift assembly illustrated in FIGS. 1-4.

Figure 1:
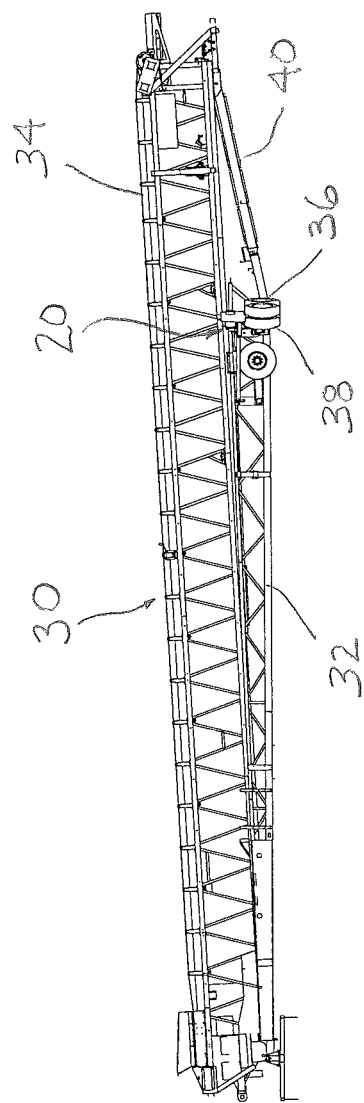
FIG. 1 is a right side view of the preferred embodiment of the conveyor lift assembly in accordance with the present invention shown on an exemplary conveyor assembly.

DESCRIPTION OF THE PREFERRED
EMBODIMENTS OF THE INVENTION

Referring now to the drawings, the preferred embodiment of the conveyor lift assembly in accordance with the present invention is illustrated by FIGS. 1 through 11. As shown in FIGS. 1-11, the preferred conveyor lift assembly is adapted to reduce undesirably high pressure spikes in the main conveyor cylinders when the conveyor frame is initially moved from a substantially horizontal position toward an elevated position. The preferred conveyor lift assembly also reduces undesirable wear to and increases the lifespan of the main conveyor cylinders. The preferred conveyor lift assembly also allows for the use of smaller, less expensive main conveyor cylinders. In addition, the preferred conveyor lift assembly reduces the lead time for replacement of the main conveyor cylinders, the tension forces in the conveyor frame, and the compression forces in the undercarriage. The preferred conveyor lift assembly also reduces the weight of the conveyor assembly and pin wear.

Referring now to FIG. 1, is a right side view of the preferred embodiment of the conveyor lift assembly in accordance with the present invention shown on an exemplary conveyor assembly. As shown in FIG. 1, the preferred conveyor lift assembly is designated generally by reference numeral 20 and exemplary conveyor assembly is designated generally by reference numeral 30. Exemplary conveyor assembly 30 comprises undercarriage 32, frame 34, axle 36, wheel 38, and at least one main conveyor cylinder 40 for moving the frame between a substantially horizontal position and an elevated position. As shown in FIG. 1, exemplary conveyor assembly 30 is in a substantially horizontal position. While FIG. 1 illustrates preferred conveyor lift assembly disposed on exemplary conveyor assembly 30 having wheels 38, it is contemplated within the scope of the invention that the conveyor lift assembly may be disposed on a stationary conveyor assembly having no wheels. It is also contemplated within the scope of the invention that exemplary conveyor assembly 30 also may include a skid, a support, and/or a pin connection disposed adjacent to axle 36.

Figure 2:
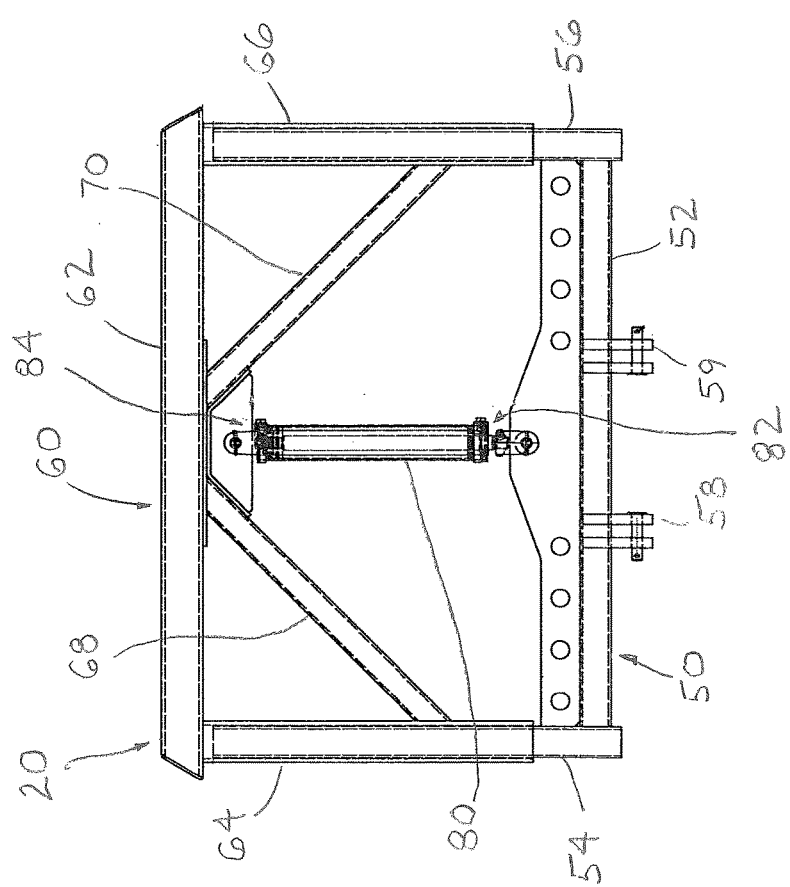
FIG. 2 is a front view of the preferred conveyor lift assembly illustrated in FIG. 1 shown in a retracted position.

Referring now to FIG. 2, a front view of preferred conveyor lift assembly 20 is illustrated. As shown in FIG. 2, preferred conveyor lift assembly 20 is in a retracted position (compare FIGS. 4 and 5). Preferred conveyor lift assembly 20 comprises lower member 50 which is disposed on undercarriage 32 of conveyor assembly 30 (see FIGS. 6-8). Preferred lower member 50 comprises substantially horizontal member 52, a pair of substantially vertical members 54 and 56, and attachment means 58 and 59. Preferably, lower member 50 is disposed adjacent to axle 36 of conveyor assembly 30.

Still referring to FIG. 2, preferred conveyor lift assembly 20 also comprises upper member 60 which is adapted to be moved substantially vertically relative to lower member 50. Preferred upper member 60 comprises substantially horizontal member 62 and a pair of substantially vertical members 64 and 66. Preferred upper member 60 also comprises at least one lateral support member 68 and 70. Preferably, substantially vertical members 64 and 66 of upper member 60 slidingly engage substantially vertical members 54 and 56 of lower member 50. Preferred upper member 60 is adapted contact frame 34 of conveyor assembly 30 (see FIGS. 6-7). More particularly, substantially horizontal member 62 of upper member 60 is adapted to contact a support saddle on frame 34 of conveyor assembly 30 when actuator 80 is in the retracted position and when the frame is in the substantially horizontal position (see FIG. 6). In addition, substantially horizontal member 62 of upper member 60 is adapted to contact the support saddle on frame 34 of conveyor assembly 30 when the frame is in a first extended position (see FIG. 7). Preferably, substantially horizontal member 62 of upper member 60 is adapted to be spaced apart from the support saddle on frame 34 of conveyor assembly 30 when the frame is in a second extended position (see FIG. 8).

Still referring to FIG. 2, preferred conveyor lift assembly 20 comprises actuator 80 having first end 82 and second end 84. Preferably, actuator 80 is disposed substantially vertically relative to frame 34 of conveyor assembly 30 when the frame is disposed in the substantially horizontal position. Preferred actuator 80 is adapted to move between a retracted position and an extended position (see also FIGS. 4-8). Preferably, first end 82 of actuator 80 is attached to lower member 50 and second end 84 of the actuator is attached to upper member 60. Preferred actuator 80 is adapted to move upper member 60 relative to lower member 50. Preferred actuator 80 comprises a hydraulic cylinder and a counterbalance valve and is moved between a retracted position and an extended position by a pump and a motor (see also FIG. 9). Preferably, actuator 80 is in fluid communication with the at least one main conveyor cylinder 40 and a reservoir (see also FIG. 9). It is contemplated within the scope of the invention, however, that the actuator may be any suitable device, mechanism, assembly, or combination thereof that is adapted to move the upper member relative to the lower member.

Figure 3:
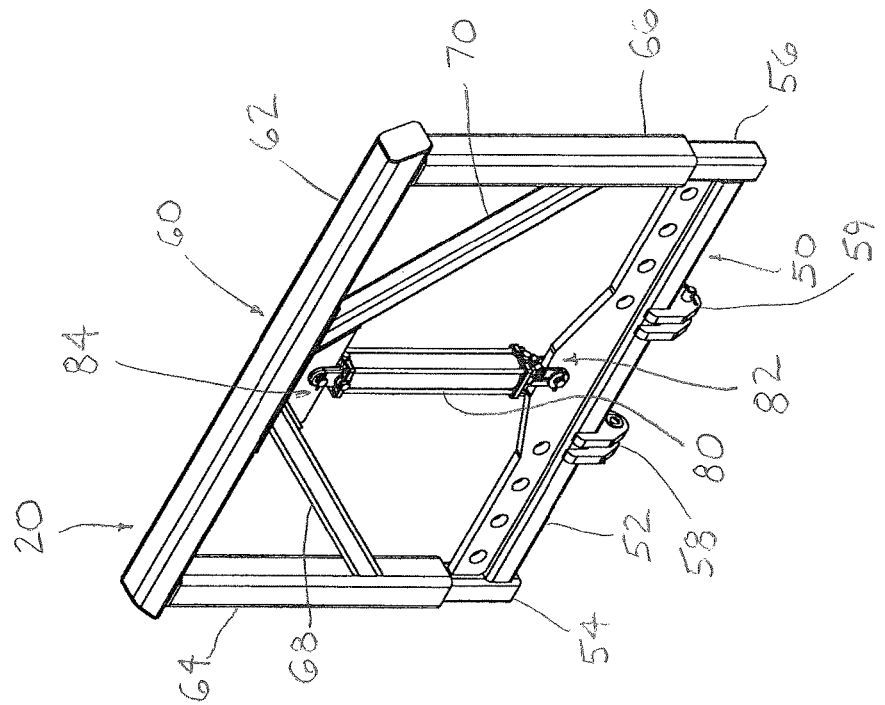
FIG. 3 is a perspective front view of the preferred conveyor lift assembly illustrated in FIGS. 1-2.

Referring now to FIG. 3, a perspective front view of preferred conveyor lift assembly 20 is illustrated. As shown in FIG. 3, preferred conveyor lift assembly 20 comprises lower member 50 having substantially horizontal member 52 and substantially vertical members 54 and 56, attachment means 58 and 59, upper member 60 having substantially horizontal member 62, substantially vertical members 64 and 66, and lateral support members 68 and 70, and actuator 80 having first end 82 and second end 84.

Referring now to FIG. 4, a front view of preferred conveyor lift assembly 20 is illustrated. As shown in FIG. 4, preferred conveyor lift assembly 20 is shown in an extended position. More particularly, preferred actuator 80 is in an extended position such that upper member 60 is moved substantially vertically relative to lower member 50. As shown in FIG. 4, preferred conveyor lift assembly 20 comprises lower member 50 having substantially horizontal member 52 and substantially vertical members 54 and 56, attachment means 58 and 59, upper member 60 having substantially horizontal member 62, substantially vertical members 64 and 66, and lateral support members 68 and 70, and actuator 80 having first end 82 and second end 84.

Referring now to FIG. 5, a perspective front view of preferred conveyor lift assembly 20 is illustrated. As shown in FIG. 5, preferred conveyor lift assembly 20 comprises lower member 50 having substantially horizontal member 52 and substantially vertical members 54 and 56, attachment means 58 and 59, upper member 60 having substantially horizontal member 62, substantially vertical members 64 and 66, and lateral support members 68 and 70, and actuator 80 having first end 82 and second end 84. While FIGS. 2-5 illustrate the preferred configuration and arrangement of conveyor lift assembly 20, it is contemplated within the scope of the invention that the conveyor lift assembly may be of any suitable configuration and arrangement.

Figure 6:
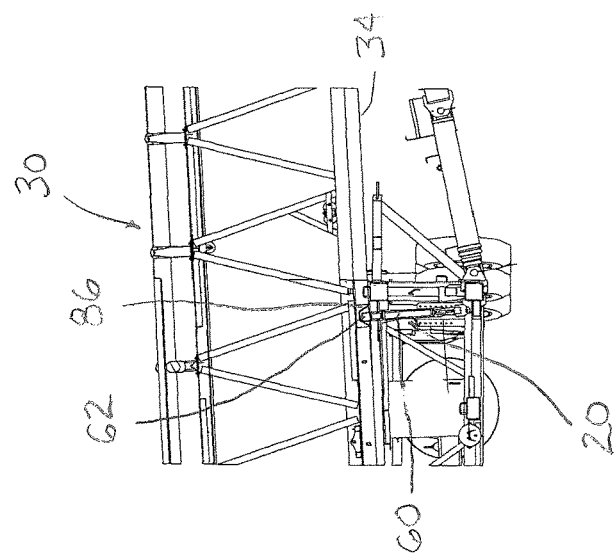
FIG. 6 is a right side view of the preferred conveyor lift assembly illustrated in FIGS. 1-5 shown on an exemplary conveyor assembly in a retracted position.

Referring now to FIG. 6, a right side view of preferred conveyor lift assembly 20 is illustrated. As shown in FIG. 6, preferred conveyor lift assembly 20 is adapted for use on exemplary conveyor assembly 30 and is in a retracted position. Preferably, in the retracted position, substantially horizontal member 62 of upper member 60 is adapted to contact support saddle 86 on frame 34 of conveyor assembly 30.

Figure 7:
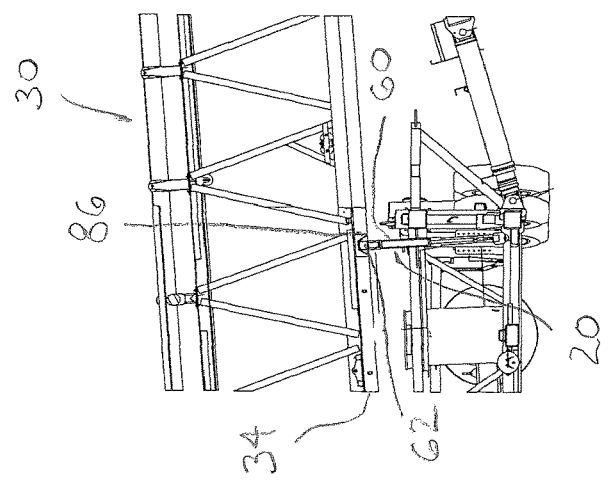
FIG. 7 is a right side view of the preferred conveyor lift assembly illustrated in FIGS. 1-6 shown on an exemplary conveyor assembly in an extended position and in contact with the conveyor frame.

Referring now to FIG. 7, a right side view of preferred conveyor lift assembly 20 is illustrated. As shown in FIG. 7, preferred conveyor lift assembly 20 is in an extended position. In the extended position, substantially horizontal member 62 of upper member 60 is adapted to contact support saddle 86 on frame 34 of conveyor assembly 30 when the frame is in a first elevated position.

Figure 8:
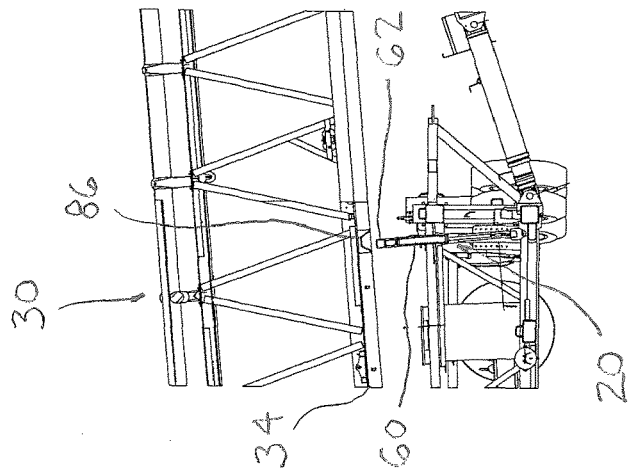
FIG. 8 is a right side view of the preferred conveyor lift assembly illustrated in FIGS. 1-7 shown on an exemplary conveyor assembly in an extended position and spaced apart from the conveyor frame.

Referring now to FIG. 8, a right side view of preferred conveyor lift assembly 20 is illustrated. As shown in FIG. 8, preferred conveyor lift assembly 20 is in an extended position. As also shown in FIG. 8, preferred substantially horizontal member 62 of upper member 60 is spaced apart from support saddle 86 on frame 34 of conveyor assembly 30 when the frame is in a second elevated position.

Figure 9:
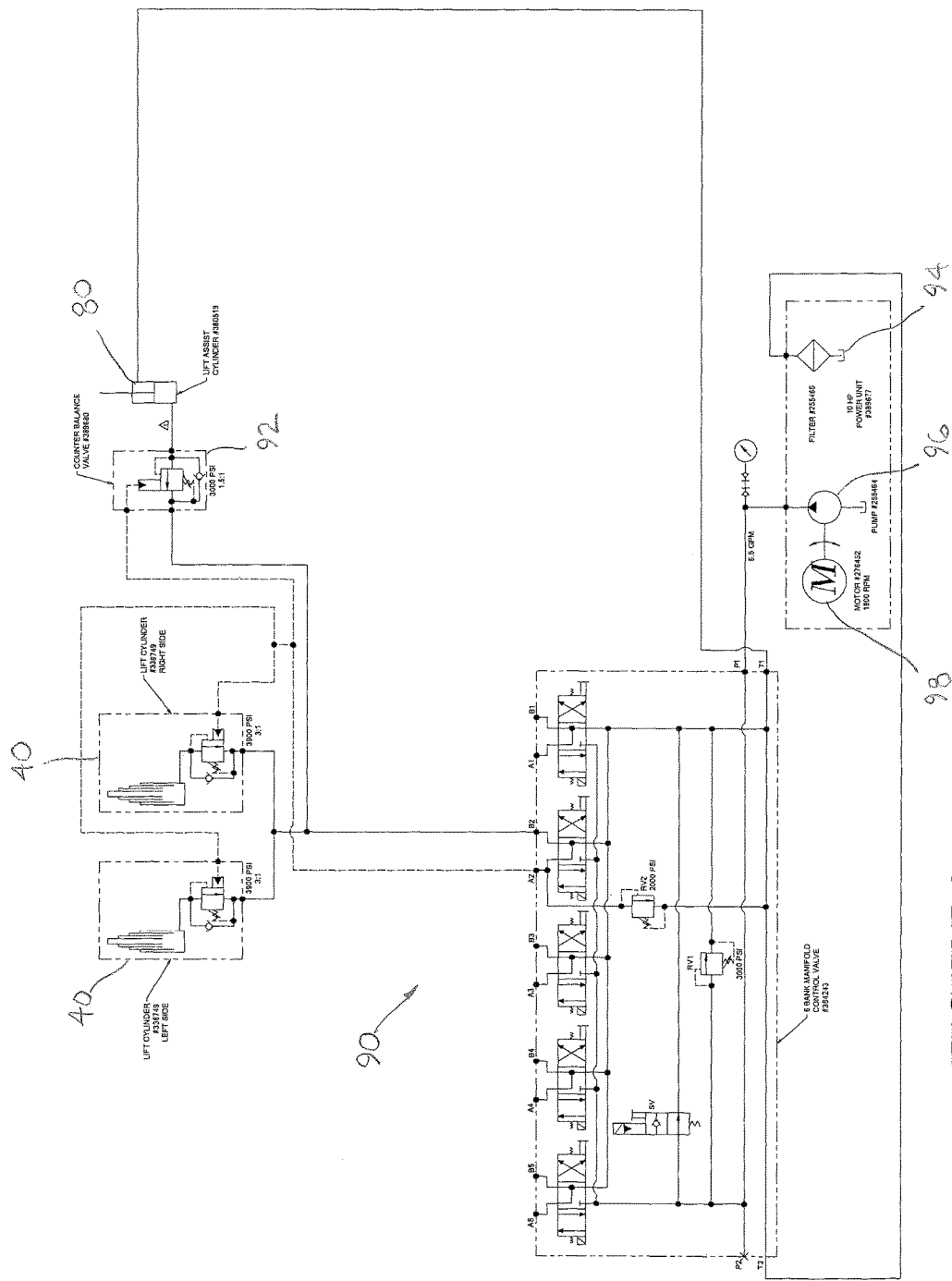
FIG. 9 is a schematic view of the preferred hydraulic circuit incorporating the conveyor lift assembly illustrated in FIGS. 1-8.

Referring now to FIG. 9, a schematic view of the preferred hydraulic circuit incorporating conveyor lift assembly 20 is illustrated. As shown in FIG. 9, the preferred hydraulic circuit is designated generally by reference numeral 90. Preferred hydraulic circuit 90 comprises main conveyor cylinders 40, actuator 80, counterbalance valve 92, reservoir 94, pump 96, and motor 98. While FIG. 9 illustrates the preferred configuration and arrangement of the hydraulic circuit for conveyor lift assembly 20, it is contemplated within the scope of the invention that the hydraulic circuit may be of any suitable configuration and arrangement.

Figure 10:
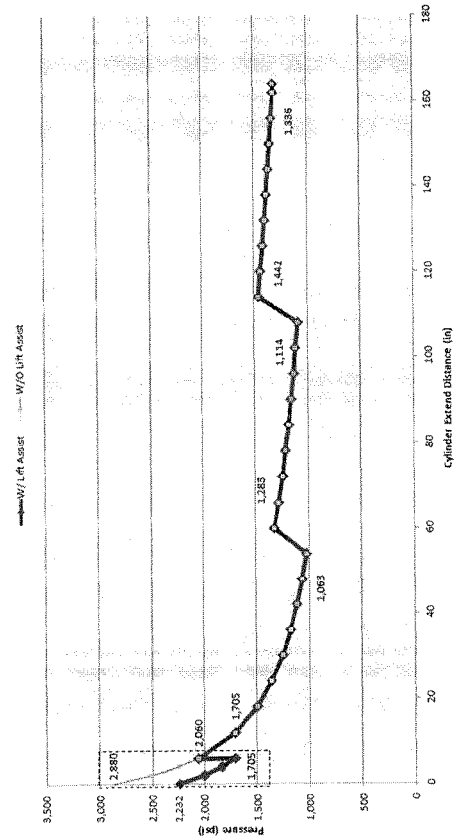
FIG. 10 is graph illustrating the pressure level experienced in the main conveyor cylinders as the cylinders move from a retracted position to an extended position.

Referring now to FIG. 10, a graph charting the pressure level experienced in main conveyor cylinders 40 as they move from a retracted position to an extended position is illustrated. More particularly, the graph illustrates the pressure levels experience in main conveyor cylinders 40 as they move from a retracted position (0 inches) to a fully extended position (165 inches) both with preferred conveyor lift assembly 20 and without the preferred conveyor lift assembly. The main conveyor cylinders used were telescoping cylinders with bores of 8-⅛ inches, 7 inches, and 6 inches and the conveyor lift assembly actuator used was a hydraulic cylinder with a 3 inch bore and an 18 inch stroke. As shown in the chart, without preferred lift assembly 20, the pressure level experienced in main conveyor cylinders 40 at the time an elevation of frame 34 of conveyor assembly 30 from the substantially horizontal position, i.e. when hydraulic cylinders 40 are in the retracted position or 0 inches, is approximately 2,880 psi (see also FIG. 11). By contrast, with the assistance of preferred conveyor lift assembly 20, the pressure level experienced in main conveyor cylinders 40 at the time an elevation of frame 34 of conveyor assembly 30 from the substantially horizontal position is only approximately 2,332 psi. In addition, as the chart illustrates, the pressure levels experienced in main conveyor cylinders 40 remain significantly lower when preferred conveyor lift assembly 20 is provided than when it is not provided until the pressure level in main conveyor cylinders 40 reaches approximately 2,060 psi at approximately 5 inches of the main conveyor cylinders' extension and at approximately 18 inches of actuators 80's extension.

Figure 11:
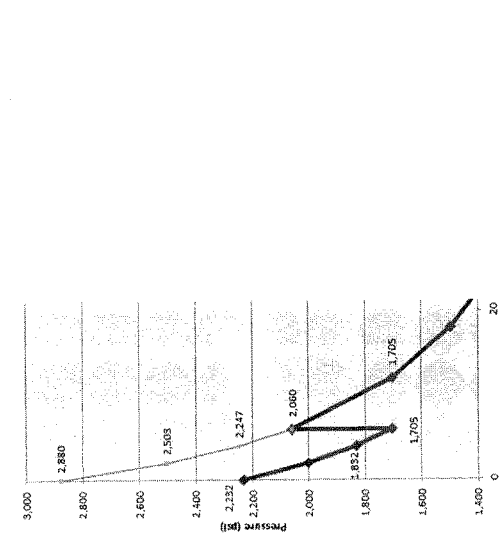
FIG. 11 is a portion of the graph illustrated in FIG. 10.

Referring now to FIG. 11, a portion of the graph illustrated in FIG. 10. More particularly, FIG. 11 illustrates the pressure levels experienced in main conveyor cylinders 40 as they move from a retracted position (0 inches) to a partially extended position of 20 inches. As shown in FIG. 11, without preferred lift assembly 20, the pressure level experienced in main conveyor cylinders 40 at the time an elevation of frame 34 of conveyor assembly 30 from the substantially horizontal position is approximately 2,880 psi (see thin line). By contrast, with the assistance of preferred conveyor lift assembly 20, the pressure level experienced in main conveyor cylinders 40 at the time an elevation of frame 34 of conveyor assembly 30 from the substantially horizontal position is only approximately 2,332 psi (see thick line). In addition, as the chart illustrates, the pressure levels experienced in main conveyor cylinders 40 remain significantly lower when preferred conveyor lift assembly 20 is provided than when it is not provided until the pressure level in main conveyor cylinders 40 reaches approximately 2,060 psi at approximately 5 inches of the main conveyor cylinders' extension and at approximately 18 inches of actuator 80's extension. While FIGS. 10 and 11 illustrate the results of a preferred configuration and arrangement of conveyor lift assembly 20, it is contemplated within the scope of the invention that other configurations and arrangements of the conveyor lift assembly may achieve similar or even improved results.

The invention also comprises a method for moving a conveyor frame between a substantially horizontal position and an elevated position. The preferred method comprises providing a conveyor lift assembly adapted for use on a conveyor assembly having an undercarriage, a frame, an axle, and at least one main conveyor cylinder for moving the frame between a substantially horizontal position and an elevated position. The preferred conveyor lift assembly comprises a lower member that is disposed on the undercarriage of the conveyor assembly, an upper member that is adapted to be moved substantially vertically relative to the lower member, and an actuator having a first end and a second end and being adapted to move between a retracted position and an extended position. In the preferred embodiments of the conveyor lift assembly, the first end of the actuator is attached to the lower member and the second end of the actuator is attached to the upper member, the actuator is adapted to move the upper member relative to the lower member, and the upper member is adapted contact the frame of the conveyor assembly. The preferred method also comprises moving the frame between the substantially horizontal position and the elevated position. In other preferred embodiments of the method of the invention, the method further comprises moving the actuator between the retracted position and the extended position.

In operation, several advantages of the preferred embodiments of the conveyor lift assembly are achieved. For example, in the preferred embodiments of the conveyor lift assembly, the hydraulic pressure lines of the main conveyor cylinders are in fluid communication with the pressure line of the conveyor lift assembly actuator. As a result, when hydraulic oil is directed to the main conveyor cylinders it is also directed to the smaller actuator of the conveyor lift assembly. Consequently, the force required from the main conveyor cylinders to elevate the frame is reduced and the pressure levels in the main conveyor cylinders do not spike as high upon the initial elevation of the frame.

Also in the preferred embodiments of the conveyor lift assembly, the actuator is disposed substantially vertically relative to the conveyor frame when the frame is in the substantially horizontal position. As a result, the force applied by the actuator to the conveyor frame is substantially vertical (or normal relative to the frame) when the frame is in the substantially horizontal position. By contrast, the main conveyor cylinders are disposed substantially horizontally (or parallel to the conveyor frame) when the frame is in the substantially horizontal position. As a result, when the pressure is increased in the main conveyor cylinders, the majority of the load produces a tension force in the conveyor frame and a compression force in the undercarriage with very little force produced in the vertical direction.

After the actuator in the conveyor lift assembly has extended approximately 18 inches and the main conveyor cylinders have extended approximately 5 inches, the angle of the main conveyor cylinders has changed enough that the required pressure has decreased and the assistance from the conveyor lift assembly actuator is no longer needed. When the conveyor frame is elevated 18 inches off the axle of the undercarriage, the conveyor lift assembly actuator is fully extended and all of the lifting force is supplied by the main conveyor cylinders.

When the actuator lift function ends, the hydraulic oil is held in the actuator with counterbalance valves so that the actuator remains in an extended position. When the conveyor frame is lowered and again comes into contact with the upper member of the conveyor lift assembly, the weight of the frame produces hydraulic pressure in the actuator sufficient to open the counterbalance valves and the hydraulic oil is allowed to drain back to the reservoir as the conveyor lift assembly assists the main conveyor cylinders in supporting the frame until it comes to rest on the undercarriage above the axle.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A conveyor lift assembly adapted for use on a conveyor assembly having an undercarriage, a frame, an axle, a tail end, and a head end, said conveyor lift assembly comprising:
   (a) a lower member, said lower member being disposed on the undercarriage of the conveyor assembly;
   (b) an upper member, said upper member being adapted to be moved substantially vertically relative to the lower member;
   (c) a vertical assist actuator, said actuator having an actuator first end and an actuator second end and being adapted to move between a retracted position and an extended position;
   (d) at least one main conveyor cylinder, said at least one main conveyor cylinder having a cylinder first end and a cylinder second end and being adapted to move between a retracted position and an extended position;
   wherein the actuator first end is attached to the lower member and the actuator second end is attached to the upper member; and wherein the actuator is adapted to move the upper member relative to the lower member; and wherein the upper member is adapted contact the frame of the conveyor assembly so as to assist the at least one main cylinder in raising and lowering the head end of the conveyor assembly over a limited distance; and wherein the cylinder first end is attached to the lower member and the cylinder second end is attached to the frame of the conveyor assembly so as to raise and lower the head end of the conveyor assembly.

2. The conveyor lift assembly of claim 1 wherein the lower member comprises a substantially horizontal member and a pair of substantially vertical members.

3. The conveyor lift assembly of claim 2 wherein the upper member comprises a substantially horizontal member and a pair of substantially vertical members.

4. The conveyor lift assembly of claim 3 wherein the pair of substantially vertical members of the lower member and the pair of substantially vertical members of the upper member sliding engage each other.

5. The conveyor lift assembly of claim 3 wherein the substantially horizontal member of the upper member is adapted to contact the frame of the conveyor assembly when the actuator is in the retracted position.

6. The conveyor lift assembly of claim 3 wherein the substantially horizontal member of the upper member is adapted to contact the frame of the conveyor assembly when the frame is in the substantially horizontal position.

7. The conveyor lift assembly of claim 3 wherein the substantially horizontal member of the upper member is adapted to contact the frame of the conveyor assembly when the frame is in a first extended position.

8. The conveyor lift assembly of claim 3 wherein the substantially horizontal member of the upper member is adapted to be spaced apart from the frame of the conveyor assembly when the frame is in a second extended position.

9. The conveyor lift assembly of claim 1 wherein the actuator comprises a hydraulic cylinder.

10. The conveyor lift assembly of claim 1 wherein the actuator is disposed substantially vertically relative to the frame of the conveyor assembly when the frame of the conveyor assembly is disposed in the substantially horizontal position.

11. The conveyor lift assembly of claim 1 wherein the actuator comprises a counterbalance valve.

12. The conveyor lift assembly of claim 1 wherein the actuator is moved between a retracted position and an extended position by a pump.

13. The conveyor lift assembly of claim 1 wherein the actuator is moved between a retracted position and an extended position by a motor.

14. The conveyor lift assembly of claim 1 wherein the actuator is in fluid communication with the at least one main conveyor cylinder.

15. The conveyor lift assembly of claim 1 wherein the actuator is in fluid communication with a reservoir.

16. The conveyor lift assembly of claim 1 further comprising at least one lateral support member.

17. The conveyor lift assembly of claim 1 wherein the lower member of the assembly is disposed adjacent to the axle of the conveyor assembly.

18. A conveyor lift assist assembly adapted for use on a conveyor assembly having an undercarriage, a frame, an axle, a tail end, and a head end, said conveyor lift assist assembly comprising:
(a) a lower member, said lower member being disposed on the undercarriage of the conveyor assembly;
(b) an upper member, said upper member being adapted to be moved substantially vertically relative to the lower member;
(c) a vertical assist actuator, said actuator having an actuator first end and an actuator second end and being adapted to move between a retracted position and an extended position;
(d) at least one main conveyor cylinder, said at least one main conveyor cylinder having a cylinder first end and a cylinder second end and being adapted to move between a retracted position and an extended position;
wherein the actuator first end is attached to the lower member and the actuator second end is attached to the upper member; and wherein the actuator is adapted to move the upper member relative to the lower member; and wherein the upper member is adapted contact the frame of the conveyor assembly so as to assist the at least one main conveyor in the raising and lowering of the head end of the conveyor assembly over a limited distance; and wherein the cylinder first end is attached to the lower member and the cylinder second end is attached to the frame of the conveyor assembly so as to raise and lower the head end of the conveyor assembly; and wherein the conveyor lift assist assembly is adapted to apply a substantially vertical force to the frame of the conveyor assembly.

19. A method for moving a conveyor frame between a substantially horizontal position and an elevated position, said method comprising:
(a) providing a conveyor lift assembly adapted for use on a conveyor assembly having an undercarriage, a frame, an axle, a tail end, and a head end, said conveyor lift assembly comprising:
(i) a lower member, said lower member being disposed on the undercarriage of the conveyor assembly;
(ii) an upper member, said upper member being adapted to be moved substantially vertically relative to the lower member;
(iii) a vertical assist actuator, said actuator having an actuator first end and an actuator second end and being adapted to move between a retracted position and an extended position;
(iv) at least one main conveyor cylinder, said at least one main conveyor cylinder having a cylinder first end and a cylinder second end and being adapted to move between a retracted position and an extended position;
wherein the actuator first end is attached to the lower member and the actuator second end is attached to the upper member; and
wherein the actuator is adapted to move the upper member relative to the lower member; and wherein the upper member is adapted contact the frame of the conveyor assembly so as to assist the at least one main cylinder in the raising and lowering of the head end of the conveyor assembly over a limited distance; and
wherein the cylinder first end is attached to the lower member and the cylinder second end is attached to the frame of the conveyor assembly so as to raise and lower the head end of the conveyor assembly;
(b) moving the frame between the substantially horizontal position and the elevated position.

20. The method of claim 19 further comprising:
(c) moving the vertical assist actuator between the retracted position and the extended position.

* * * * *